US011010423B2

(12) United States Patent
Roy et al.

(10) Patent No.: US 11,010,423 B2
(45) Date of Patent: May 18, 2021

(54) POPULATING DATA FIELDS IN ELECTRONIC DOCUMENTS

(71) Applicant: ACCENTURE GLOBAL SOLUTIONS LIMITED, Dublin (IE)

(72) Inventors: Subhasish Roy, Bangalore (IN); Inderpreet Singh, Franklin Park, NJ (US); Anobika Roy, Bangalore (IN); Yabesh Jebaraj, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 51 days.

(21) Appl. No.: 16/105,429

(22) Filed: Aug. 20, 2018

(65) Prior Publication Data

US 2020/0057801 A1    Feb. 20, 2020

(51) Int. Cl.
*G06F 16/583* (2019.01)
*G06K 9/00* (2006.01)
*G06T 3/60* (2006.01)
*G06T 7/70* (2017.01)
*G06F 40/174* (2020.01)

(52) U.S. Cl.
CPC ........ *G06F 16/5846* (2019.01); *G06F 40/174* (2020.01); *G06K 9/00463* (2013.01); *G06K 9/00483* (2013.01); *G06T 3/60* (2013.01); *G06T 7/70* (2017.01); *G06K 9/00469* (2013.01); *G06K 2209/01* (2013.01)

(58) Field of Classification Search
CPC ............ G06K 9/6215; G06K 9/00469; G06K 9/00463; G06T 3/60; G06F 17/243; G06F 16/5846
See application file for complete search history.

(56) References Cited

U.S. PATENT DOCUMENTS

| 4,926,490 | A | * | 5/1990 | Mano | G06K 9/3283 382/177 |
| 6,473,753 | B1 | * | 10/2002 | Katariya et al. | G06F 40/30 |
| 9,373,030 | B2 | | 6/2016 | van Deventer et al. | |
| 2010/0054612 | A1 | * | 3/2010 | Konno | G06F 17/289 382/229 |

(Continued)

FOREIGN PATENT DOCUMENTS

KR    20140046556 A  *  4/2014

*Primary Examiner* — Scott T Baderman
*Assistant Examiner* — Seung Woon Jung
(74) *Attorney, Agent, or Firm* — Mannava & Kang, P.C.

(57) ABSTRACT

Examples of systems and methods for automatic population of electronic documents are described. In an example, a digital base document having the information to be populated in a data field of the electronic document may be obtained. From the digital base document a data item to provide the information may be extracted. Further, for the digital base document, a similarity score may be computed with respect to each document type defined in predefined mapping data, the predefined mapping data including, for each document type, a weight associated with data items occurring in the document type, the weight being associated based on the importance of the data item to the document. Based on the similarity score, a document type of the digital base document may be identified. Further, based on a position of the data item in the digital base document and the identified document type, the data field may be populated.

11 Claims, 10 Drawing Sheets

(56) References Cited

U.S. PATENT DOCUMENTS

| | | |
|---|---|---|
| 2011/0170788 A1* | 7/2011 | Nepomniachtchi ........................ G06K 9/00463 382/229 |
| 2015/0149372 A1 | 5/2015 | Morimoto et al. |
| 2016/0210507 A1* | 7/2016 | Abdollahian ............. G06T 3/60 |
| 2016/0259863 A1 | 9/2016 | Allen et al. |
| 2019/0303447 A1* | 10/2019 | Mohiuddin Khan ........................ G06K 9/00469 |

* cited by examiner

150

155

City1\nClass\NQWE RTY, GOVERNOR\n Mike Rankin, Registrar, BMV\n7502UJ7325190000\nSA DRIVER LICENSE\nXYZ\n2 ABC PQR\n8 69BIG HAMMER LN\n STATE, CY1, 65109\n4d LICENSE NO. 3BIRTHDATE\Ntl5457960\U00F4-02-01-1979\n9 CLASS 4 EFIRES\ND 06-22-2018\n4a ISSUE DATE\n9a ENDORS 12 RESTER\n05-22-1370\N15 SEX:F 16Ht. 6-05 17W.245\ninson 18 EYES: BLUE 19 HAIR:BLOND\n

160-1
160-2

Line No 1: NQWE RTY, GOVERNOR
Line No 2: Mike Rankin, Registrar, BMV
Line No 3: 7502UJ7325190000
Line No 4: CITY1
Line No 5: SA DRIVER LICENSE
Line No 6: XYZ
Line No 7: ABC PQR
Line No 8: 8 69BIG HAMMER LN
Line No 9: STATE, CY1, 65109
Line No 10: 4d LICENSE NO. 3BIRTHDATE
Line No 11: Ntl5457960U00F4-02-01-1979
Line No 12: 9 CLASS 4 EFIRES
Line No 13: D 06-22-2018
Line No 14: 4a ISSUE DATE
Line No 15: 9a ENDORS 12 RESTER
Line No 16: 05-22-1370
Line No 17: 15 SEX:F 16Ht. 6-05 17W.245
Line No 18: inson 18 EYES: BLUE 19 HAIR:BLOND

FIG. 1b

POPULATING DATA FIELDS IN ELECTRONIC DOCUMENTS

BACKGROUND

Generally, users are required to submit fill out various electronic documents for a variety of reasons. These reasons may include, for example, verifying the identity of users, submitting applications for enrolment, purchasing services, etc. Most of the electronic documents require users' personal information to be filled against various fields in an electronic document.

Such personal information may be similar to information on documents associated with a user, such as proof of identity, proof of immigration and citizenship status, proof of address, proof of income, and proof of birth and/or death. However, despite the availability of personal documents in digital format, the details are often filled in the electronic documents manually, which can be time-consuming, tedious, and error-prone.

Presently, available systems are generally limited to text extraction and often fail to use this information to fill out the electronic forms. The capability of such systems generally ends at only recognizing the text without giving any meaning to the extracted text. Further, the use of certain systems may be limited by the type of documents it can process, for instance, due to lack of storage space, non-availability of templates, etc. Additionally, substantial manual intervention may be required to analyze any new document type.

The present disclosure provides a technical solution to a problem to efficiently and accurately recognize and identify information in a digital personal document, and extract relevant information for auto-filling electronic documents.

BRIEF DESCRIPTION OF DRAWINGS

Features of the present disclosure are illustrated by way of examples shown in the following figures. In the following figures, like numerals indicate like elements, in which:

FIG. 1b illustrates an example line to data item calibration, according to an example embodiment of the present disclosure

DETAILED DESCRIPTION

Figure 1A:
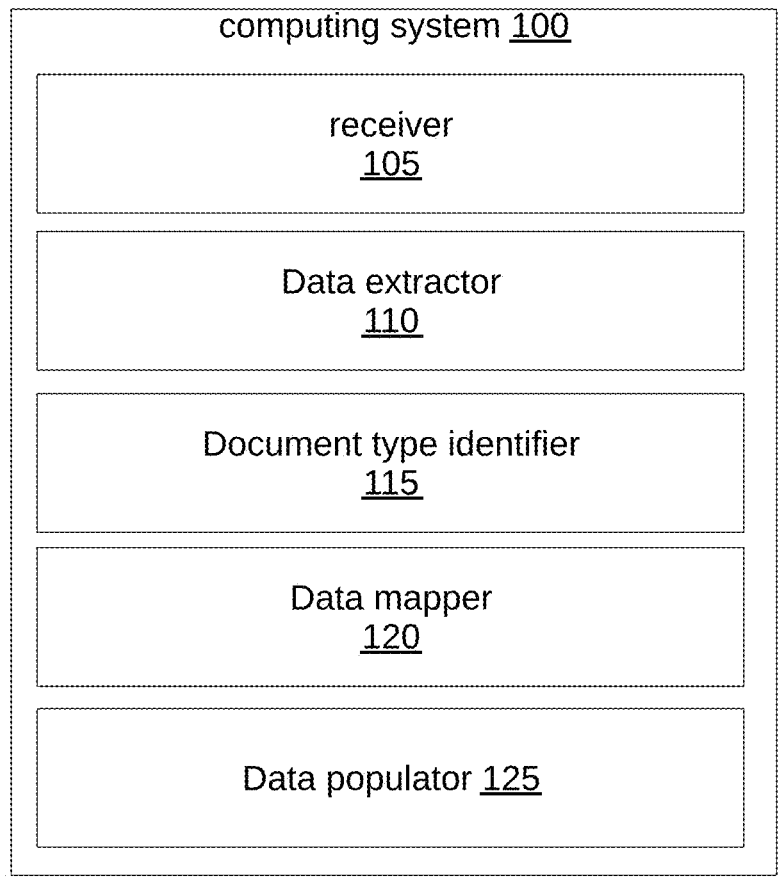
FIG. 1a illustrates a block diagram of a computing system for auto-populating data fields in an electronic document, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present disclosure describes systems and methods for auto-filling electronic documents. In an example, an electronic document to be populated with data, such as personal data, account related data, template based data, invoice related data, and the like, may be received. The electronic document may be an online form, an invoice form, or any other document type, which requires the user to fill in details corresponding to certain fields. The electronic document, therefore, may include multiple data fields and a corresponding field insert portion, where relevant data may be entered. Conventionally, the user had to manually enter the relevant data, which in addition to being cumbersome and time consuming may also be prone to errors. The present subject matter provides for automatically filling in the data corresponding to the data fields without user intervention.

In an example embodiment, to fill in the electronic document, a digital copy of a base document may be obtained. A base document may be any document having the relevant data corresponding to the one or more data fields to be populated. For example, in case personal details may be required, a driver's license, a passport, or any other identification document may serve as the base document. In another example, in case an invoice template is to be filled, a sale receipt may be the base document. On receiving the image, the image may be validated to determine if data extraction from the current image of the base document would provide accurate data.

To validate, data items, which may be text data and/or image data, may be extracted or detected. For example, a driver's license may have the data items, such as, "Ohio" (name of the state), "John" (name of the person", "name", "expiry date", and the like. The data items may be detected using visual analytics tool, such as, for example, optical character recognition (OCR). On detecting the data items, a combined angle of inclination of the image may be computed, based on an angle of inclination of the data items. The combined angle of inclination may be compared with a predetermined angle range. If the combined angle of inclination is not in the range, the image may not be validated and the image may be rotated to an angle, which is in the range. Once, validated, the data items may be stored for further analysis.

Upon validation, similarity scores may be generated, based on the predefined mapping data, which includes for each base document type, a mapping indicative of a weight associated with each keyword that appears in that document type. Thus, a similarity score may be generated for each document type defined in the mapping data. In an example, the document type, with the highest score is selected as the document type of the base document provided by the user.

On identifying the document type, a position of each data item may be determined. The position may be defined in terms of the line number that they appear in the base document. A line may be understood to be a horizontal line extending from one vertical edge of the base document to the other. Further, the order of words may be from left to right, when the image of the base document is facing a user. Upon determining position of the data item, word-line calibration, keyword extraction may be performed using at least one of a static approach or a dynamic approach. In a static approach, upon determining position, the keywords may be determined based on keywords stored in a database during a training process. The data field may be associated with the keyword or the data item, i.e. a meaning may be associated with the data item of the base document. The dynamic approach may implement natural language processing (NLP) techniques to map data items to the data fields. The choice of use of the static approach or dynamic approach to extract keywords may depend on the field type in the document. For example, if the keyword "amount", then the word "amount" is fairly common across documents, so the static approach may work because the disclosed system may be able to train itself to search for a keyword such as "amount". On the other hand, if the field type is the "address" field, then the disclosed system may use the dynamic approach because it may be infeasible to store all possible city, state, and zip code (components of an address) combinations to implement the static approach. In this case, the use of NLP techniques in the dynamic approach may yield a more accurate outcome.

In an example, upon identifying the document type of the base document, keywords (data items) that need to be extracted from the base document may be identified. For example, if the given document is a driver license then address, name, DoB, etc., may be extracted. The system uses either static or dynamic approach based on the field type. If it is a keyword such as 'amount'/'total amount'/'total payment', which is common across the documents, then a static approach may be used. In case of a keyword such as address field, where the city, stat code and zip code are considered as a dynamic keyword for identifying the address data, the dynamic approach may be used.

Upon mapping data fields to the data items, and prior to populating, a format of associated with the data field may be determined. For instance, date of birth requested in the electronic form may be in the format "MM-DD-YYYY", while the date of birth in the base document may be in the format "DD-MM-YYYY". The data item to be populated may be converted into required format and provided for populating in the electronic document Thus, the present subject matter provides for automatically populating data fields in the electronic documents without manual intervention. Further, because the data is automatically fed in, errors are minimized. Further, the disclosed matter provides for mapping of the data item using a keyword approach instead on template based approach, which limits the scalability of a system. For instance, the conventional systems require a template to be stored for every possible document type, which as a result may cover only a limited set of documents. Owing to present keyword-based approach, the knowledge about each type of document may not be required since the data\keywords in all the documents are somewhat similar while it's only the location of the keyword that may vary. For example, 'DOB' or 'Date of Birth' is the keywords to find the date of birth in a document, which may be positioned at different locations in different documents. The disclosed matter provides two ways to construct the keywords, static and dynamic. In dynamic approach, the keywords are constructed dynamically with the help of natural language processing techniques (NLP), while in static approach, the keywords are collected from prior training and stored in a database, which may be accessed to perform data population using techniques consistent with the present disclosure.

FIG. 1a illustrates a computing system 100 for auto populating data fields in an electronic document, according to an example embodiment of the present disclosure. In an example embodiment, the computing system 100, hereinafter referred to as system 100, uses a combination of Artificial Intelligence (AI) techniques, natural language processing techniques, and machine learning techniques to perform a variety of operations associated with document validation, data extraction, data mapping, and data populating.

In an example, the system 100, amongst other components, includes a receiver 105, a data extractor 110, a document type identifier 115, a data mapper 120, and data populator 125.

The system 100 provides for automatically filling various data fields in an electronic document, such as identity based documents, employment related document, banking related documents, invoice related documents, or any other document having data fields, whose data may gathered on processing another digital document. The data fields may be fields against which user is required to provide relevant information. For instance, data fields may be name, address, data of birth, age, sex, country of residence, and the like. The present subject matter has been explained in considerable details with respect to processing of personal documents to fill out electronic documents requiring such information, however, it will be appreciated that similar principals may be extended for auto populating other electronic documents as well, for instance, filling a reimbursement forms based on sale receipts.

In an example embodiment, the receiver 105 may receive an electronic document having multiple data fields to be populated. To facilitate the auto-filling of the data fields, the data extractor 110 may obtain a digital base document, which may have information to be populated in the data fields. In an example, a user may provide the digital base document. Alternatively, the data extractor 110 may obtain the base document from a repository associated with the computing system 100. The base document may be, for example, personal IDs, (driver's license, passport, credit card, etc.); template based documents (tax statements, utility bills, etc.), or any other document, which may store information in a predefined format.

The digital base document may be, for instance, an image of the base document. The data extractor 110, using visual analytics tools, such as OCR, may extract data items from the digital base document, hereinafter referred to as base document. The data items may include text data and image data. The image data may include, for instance, logos, such as national emblem, government department logos identifying the government, etc.; and the text data may include text terms and keywords. The keywords may be static terms, which may be repeated across documents of similar type, such as, "name", "date of birth", "address", "of", "the", etc.; while the text terms may be dynamic terms, which change for each user, such as, "John", "Selena", etc.

Upon detecting the data items, the data extractor 110 may ascertain whether the digital version of the base document is a valid for data extraction to ensure accuracy of extraction.

The validity may pertain to quality of the base document. In an example, the validity may be ascertained, based on a combined angle of inclination of the base document. The combined angle of inclination in turn may be based on angle of inclination of a plurality of the data items.

For computing angle of inclination, a bounding area of a data item may be identified, the bounding area being an area enclosing the data item. The bounding area may typically be a quadrilateral, such as a square, rectangle, or a trapezoid. The angle of inclination of the bounding area may be defined based on position of vertices of the bounding area. In an example, the angle of inclination of a bounding area may be computed using:

$$\text{Angle of inclination (Bounding area)} = \tan[(y_2-y_1)/(x_2-x_1)] \quad (1)$$

Further, mean and/or standard deviation of multiple data items may be computed to determine combined angle of inclination. In an example, bounding areas of all the data items may be considered. In other example, bounding areas of a predefined number of data items may be considered, which may be selected randomly or based on any criteria, such as length of the data item, position of the data item, etc.

The combined angle of inclination may be compared with a predefined angle range. For determining whether the combined angle is in the range it may be determined whether "Mean+2*SD<Angle Range<Mean−2*SD". If the combined angle of inclination is determined to be in the range, the base document is validated, else, the base document may be adjusted, such as, the base document may be rotated, to have the combined angle of inclination with the predefined angle range. Upon validation, the data items may be extracted along with details pertaining to bounding points for further analysis as will be explained later.

Upon validation, the document type identifier 115 may determine the type of the base document. In an example, the user may provide an input identifying the document type. In another example, where the computing system 100 automatically obtains the base document from a repository, the document type may be tagged to the base document and the document type identifier may identify the document type, based on the tagging. In yet another example, the document type identifier 115 may dynamically identify the document type of the base document. For instance, a supervised machine learning approach to classify the documents based on the contents of the document. In said example, similarity scores may be generated for the base document, based on predefined mapping data, which includes a table for each document type, the table including a weight associated with each keyword appearing in that document type. The computation of the similarity scores is explained in detail with reference to description of FIG. 2.

The document type identifier may determine the type of the base document, based on the similarity scores. For instance, a class of the documents against which highest similarity score is achieved may be selected as the document type.

On determining the document type of the base document, the data mapper 120 may provide for tagging the data items to corresponding data fields, i.e. associate meaning to the extracted data. The data mapper 120 may determine a position of each of the data, based on the bounding points associated the extracted data items. The bounding points are the point sets, which cover the area of the words in the image. As mentioned earlier shape of the area covered by the bounding points may be in shape of a quadrilateral. The data items are converted to lines based upon the bounding point information. This aids for identification of the lines, which are above or below to a data item and to identify the data items which are right or left to a keyword/other data items.

In an example, to determine the position relative to the lines, the data mapper 120 may sort the data items based on vertical axis (y-axis) and horizontal axis (x-axis) coordinates, which may be obtained from the bounding point information. Upon sorting, the data items may be collected or dumped to form a list. The first element in the list may be considered as the first word in the first line and its midpoint based on vertical coordinates is determined. Thereafter, the subsequent elements in the list are taken and if the midpoint of the first word in the current line lies between the vertical coordinates (y1 and y2) of an element, then the element is considered as the next word in the current line. If not, that element is considered as the first word of the next line and the same process if repeated for the subsequent elements. As a result, the blocks/words may be added in for the data items an order as they appear in the line.

The same is repeated for all data items and/or lines and the position of the data item w.r.t. line is the base document may be defined. Upon obtaining the position information in terms of line number and the order in which the word appear, the data mapper 120 may tag the data items to corresponding data fields, based on the position and the identified document type.

FIG. 1b illustrates an example line to data item calibration 150. Block 155 represents extracted data items and upon processing performed by the data mapper 120 position of the various data items in terms of lines is expressed. "Line No. 1" 160-1 includes data items "NQWE RTY, GOVERNOR", "Line No. 2" 160-2 includes data items "Mike Rankin, Registrar, BMV", and so forth.

Referring back FIG. 1a, in an example, the data mapper 120 may compare the position of the data item with a corresponding position in the identified document type to determine a corresponding field. For instance, the identified document type, say Pay slip, 'total payment' is marked as one of the data fields and any number which is at the bottom or right to the keyword 'total payment' is the amount. Such a mapping may be based on prior document training (static mapping), i.e., where data pertaining to document position of the data fields is gathered and saved in a database.

In another example, the data items may be tagged dynamically using natural language processing (NLP) techniques. For instance, the address lines and driver name is present on top of the city, state—zip code line in a driver's license. NLP may be used to construct the keywords: city, state—zip code to provide result:

Michell W
Smith
222 2nd AVE
SAN DIEGO, Calif. 92101

For dynamic tagging, for the identified document types, keywords/data fields in the table of the document type may be obtained. The keywords may be searched in the extracted lines for dynamic data item to line calibration. When the keyword is found, the data items to the right\bottom of the keywords may be validated. For example, 'DOB' is the keyword, then the text in right or bottom is validated against a predefined date format. If the text is in the date format, then it is validated to be DOB. Similarly, for "Payment" the string is validated for amount format ($d*.dd). Upon validation, the corresponding data field is provided as the output.

Some documents are considered as standard, such as Driver's license that have a specific format, while some other documents are non-standard, such as Utility bills, Lease agreement, receipts, etc that do not have any specified format. For most of the standard documents, dynamic keyword construction may be used and for non-standard documents, we use the keywords taken from the document training, i.e., static document mapping.

Table 1 provides keywords for various document types:

TABLE 1

| SNO | Document Type | Fields |
|---|---|---|
| 1 | Driver License | First Name, Last Name, DOB, Gender, Address Lines, City, State, Zip Code |
| 2 | State ID Card | First Name, Last Name, DOB, Gender, Address Lines, City, State, Zip Code |
| 3 | US Passport | First Name, Last Name, DOB, Gender |
| 4 | Birth Certificate | First Name, Last Name, DOB, Gender, City, County, State |
| 5 | Current Benefit Check | Check Amount |
| 6 | Current Income Tax Statement | Amount |
| 7 | Permanent Resident Card | Document Number, Alien Registration Number, Expiration Date |
| 8 | Utility Bill | Amount, Frequency |
| 9 | Re-Entry Permit | Document Number, Expiration Date |
| 10 | Citizenship Certificate | Citizenship Details |
| 11 | Naturalization Certificate | Citizenship Details |
| 12 | Current Pay Statement | Total amount, Employer Name, Pay Frequency |
| 13 | Medical Bill | Amount |
| 14 | Child Support Agreement | Amount, Frequency |
| 15 | Rent Receipt | Amount, Frequency |
| 16 | Unemployment Insurance Statement | Amount, Frequency |
| 17 | House Owner Insurance Statement | Amount, Frequency |
| 18 | Real Estate Property Tax Statement | Amount, Frequency |
| 19 | Current Benefit Award Letter | Amount |
| 20 | SSA Correspondence | Amount |
| 21 | Drug Card | Claim Number |
| 22 | VA Correspondence | Amount, Frequency |
| 23 | Lease Agreement | Amount |
| 24 | Medicare Award Letter | Amount |
| 25 | Health Insurance Statement | Amount |
| 26 | Arrival Departure Online | Document Number, Expiration Date |
| 27 | Dependent Care Receipt | Amount |

Accordingly, data fields for the data items may be determined and may be tagged to them. Upon tagging the data fields to the data items, the data populator 125 may populate the data item in the relevant data fields in the electronic document received by the computing system 100. In an example, prior to populating, the data populator 125 may check for format of the data field and the data item to ensure that output is provided in required format. For instance, the base document may have name as first name followed by last name, while the data field in the electronic document may be in the format last name followed by first name. The data populator 125 may generate the output in the required format.

The data populator 125 may associate the data item with the corresponding data field and frame the JSON response. In an example, the computing system 100 may receive a passport as the base document, where First name, Last name, DOB, Gender are the fields associated with it. The data populator 125 may provide the first name, last name, DOB and then gender information from the text and form the JSON response as illustrated by sample output below:

```
{
    'FirstName': 'John',
    'LastName': 'Smith',
    'DOB'      : '02/10/1990',
```

-continued

```
    'Gender'   : 'M'
}
```

Thus, the computing system 100 may based on input: "formtype":"Identity","imagedata":"<Base64 encoded image data>"} provide output:

```
[{"imagetype":"DriverLicense"},{"formtype","Identity"},{"firstname":"Francesca
Marie","lastname":"Sr Sample","dob":"02/01/1979","city":"JEFFERSON
CITY","state":"MO","zipcode":"63109","gender":"","residentofstate":"MO","addrline1
":"123 MAIN STREET","addrline2":"APT. 4"}]
``` which is used to auto-fill the data fields in the electronic document.

"Imagetype" indicates the type of the document, which is explained below. The data extractor 110 may extract the data, once the document type is identified or in certain example, prior to that. "Formtype" indicates a type of the electronic document. In an example, the form-type may be defined in a front end request or a user request.

Figure 2A:
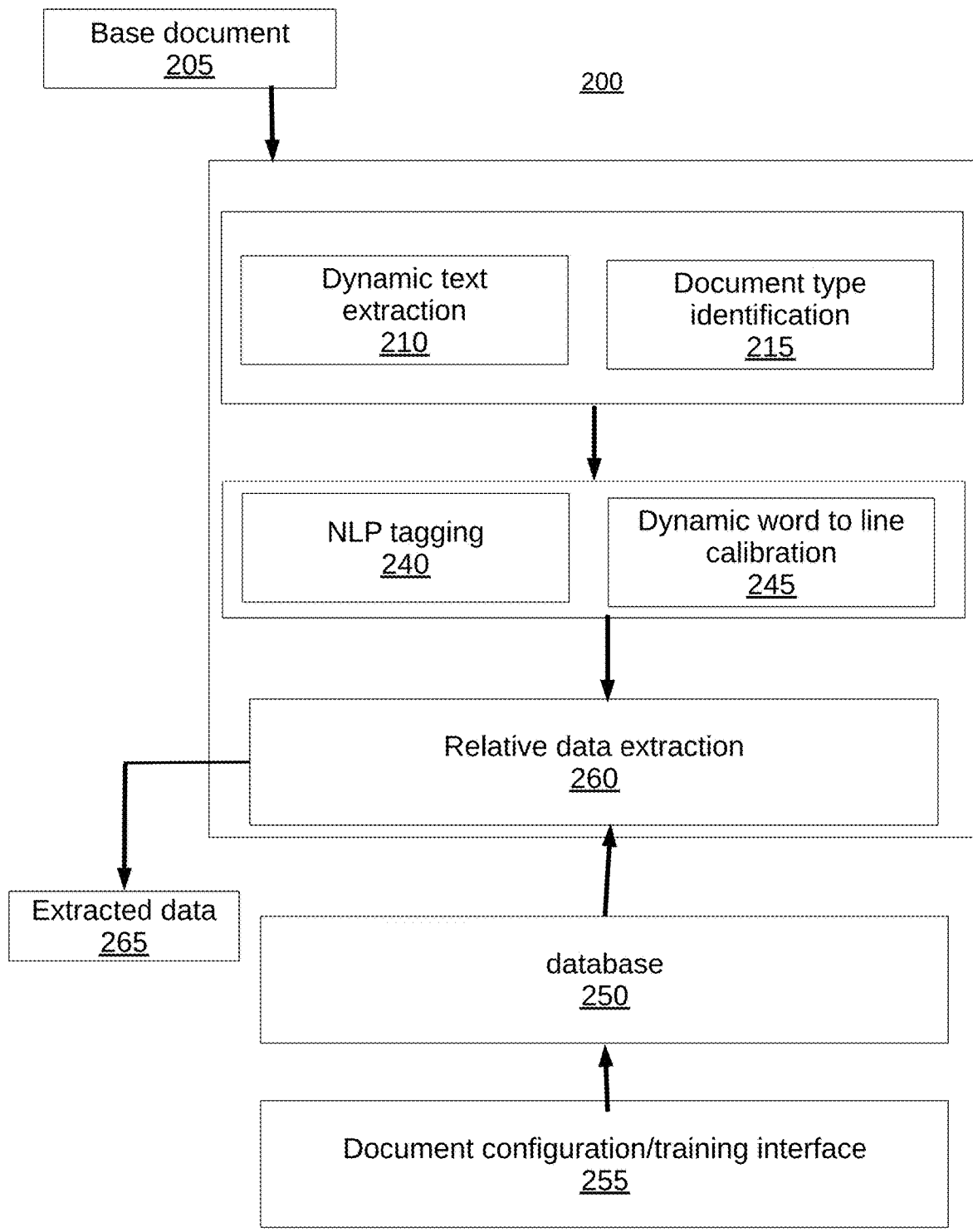
FIG. 2a illustrates another block diagram of the computing system, according to an example embodiment of the present disclosure.

FIG. 2a illustrates a block diagram 200 illustrating the functioning of the system 100, according to an implementation of the present subject matter. The system 100 may be provided on a local device, such as a smart phone, tablet, personal desktop and the like or in a distributed environment, where one or more of the components may be provided over a network, such as, provided over a cloud server.

In an example, on receiving an electronic document, which may be received by a local device, the auto-filling process may be initiated. To provide for auto-filling, a digital base document 205 may be provided. In case of processing being done in the distributed environment, the digital base document 205 may be provided to the server having one or more functionalities of the computing system 100. Upon receiving the digital base document 205, dynamic text extraction may be performed at block 210. The dynamic text extraction 210 may be performed by implementing the data extractor 110, where the base document may be validated based on combined angle of inclination and data extraction may be performed accordingly.

Figure 2B:
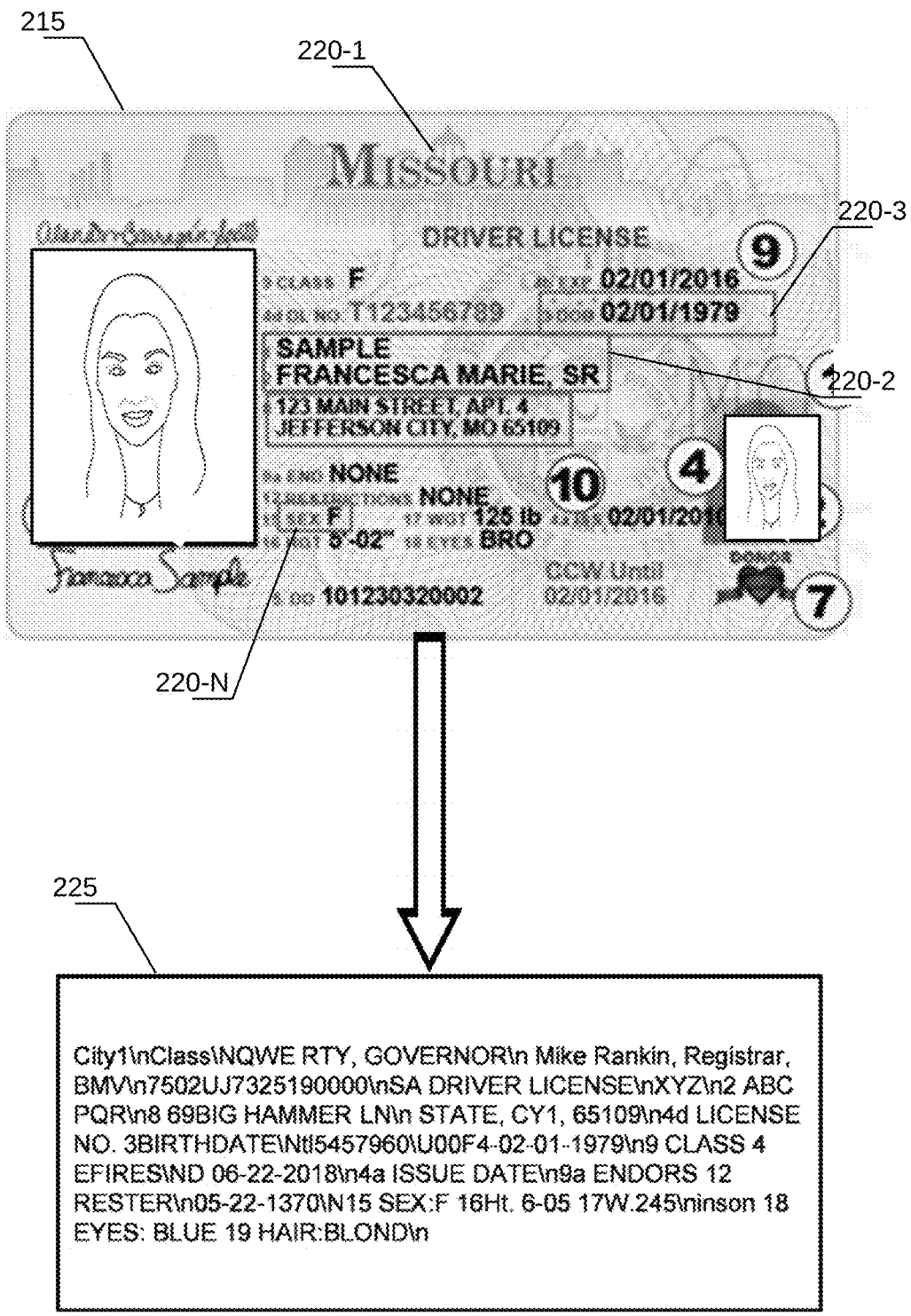
FIG. 2b illustrates data extraction from a base document, according to an example embodiment of the present disclosure.
Figure 2C:
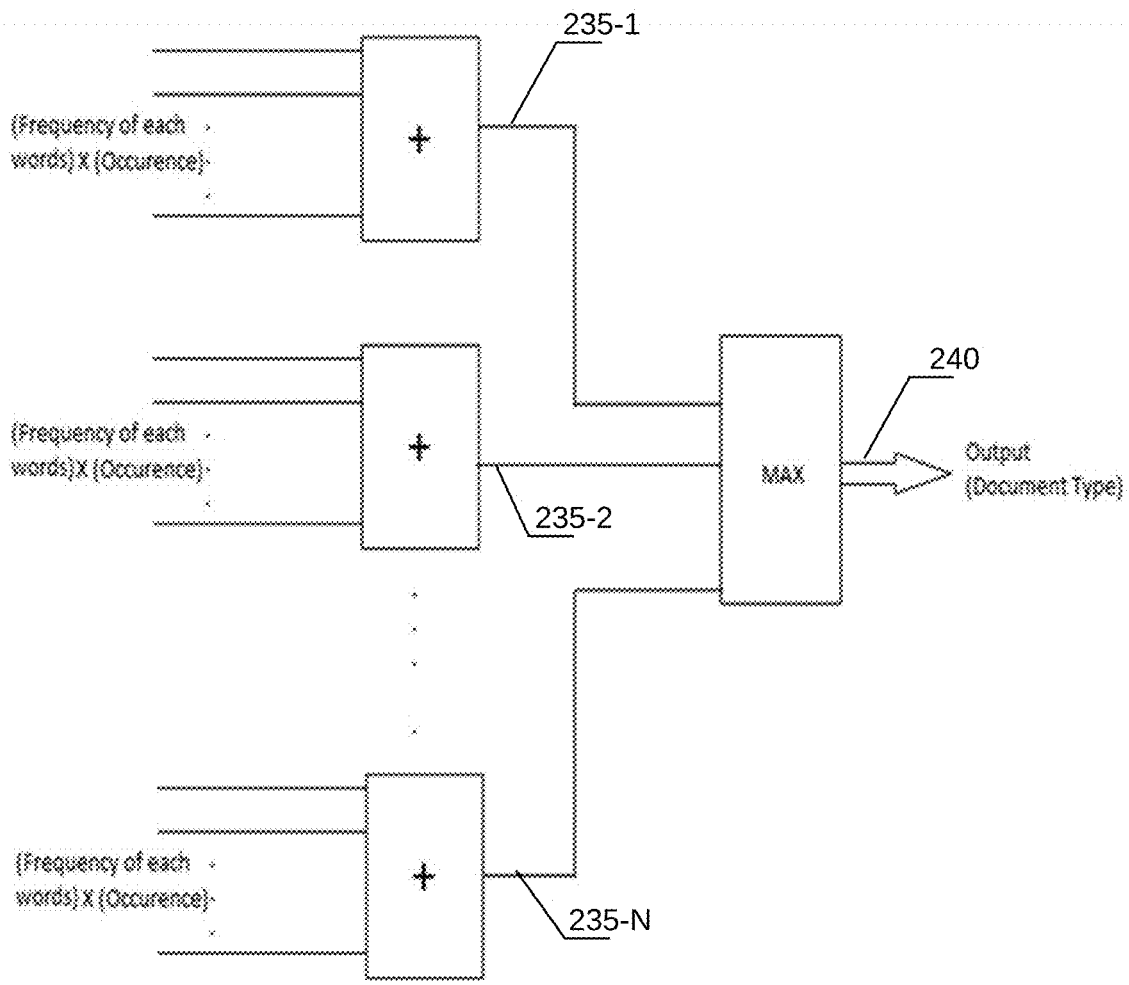
FIG. 2c pictorially illustrates document type identification, according to an example embodiment of the present disclosure.

An example of data extraction is illustrated in FIG. 2b. The data extractor 110 may receive the base document 215 with the relevant details. In said example, the base document is a driver's license and the data items may be "Missouri" 220-1, "FRANCESCA MARIE, SR" 220-2, "01/01/2016" 220-3 and "Sex F" 220-N. The data items may be extracted, upon dynamic data extraction 210, to provide extracted data 225.

Referring back to FIG. 2a, at block 230, document type may be identified, for instance, using the document type identifier 115. In an example, for document type identification, a corpus or collection of documents may be built. To build the corpus, the data from all the digital base documents that form a sample for each document may be extracted and stored in a corresponding text file. The collection of all these text files forms the corpus. Further, number of documents for each class of document (for example Driver's License) may be kept equal so that keyword prediction is accurate.

For each document class/type, term frequency and inverse document frequency (TF-IDF) may be determined. For classification, weight is used to create a classifier. TF-IDF reflects how important the word is to a document in a collection (corpus). Term Frequency (TF) reflects how frequently a word is occurring in a document, while Inverse Document Frequency(IDF) measures how important the word is. A base document may include certain words like 'is', 'of', 'the', etc., which may appear frequently in all the documents but don't help in classifying the documents. IDF assigns less weightage to commonly occurring words or grammar related text between the documents.

In an example, "bag of words" approach or a vector space model may be used to represent all the words in the corpus along with its weight (tf-df). For example, for California's driver's license, keywords may be "E CALIFORNIA DRIVER LICENSE DOB 01/01/1997 EXP 01/01/2020 . . . .", the weight associated with the keywords are provided in table 2:

TABLE 2

| Keyword | Weight |
|---|---|
| E | 0.01 |
| CALIFORNIA | 0.5 |
| DRIVER | 0.9 |
| LICENSE | 0.9 |
| DOB | 0.7 |
| Jan. 1, 1997 | 0.01 |
| EXP | 0.7 |
| Jan. 1, 2020 | 0.02 |
| Arizona | 0 |
| USA | 0 |

TABLE 2-continued

| Keyword | Weight |
|---|---|
| 9 | 0 |
| CLASS | 0 |
| D | 0 |
| Jan. 4, 2030 | 0 |

Likewise, for Arizona's driver's license, weight associated with the keywords are provided in table 3:

TABLE 3

| Word | Weight |
|---|---|
| E | 0 |
| CALIFORNIA | 0 |
| DRIVER | 0.9 |
| LICENSE | 0.9 |
| DOB | 0 |
| Jan. 1, 1997 | 0 |
| EXP | 0.7 |
| Jan. 1, 2020 | 0 |
| Arizona | 0.5 |
| USA | 0.5 |
| 9 | 0.01 |
| CLASS | 0.7 |
| D | 0.01 |
| Jan. 4, 2030 | 0.01 |

Further, a frequency table may be constructed for each class of document, i.e., each document type. This table may be used for predicting the type of the given document. The tables for all the document types may be stored in the predefined mapping data, which is used for document type prediction.

For determining the document, extracted data items may be obtained. All the keywords in the frequency tables of each of the document types are searched against the extracted data. If the keyword is found, the weight of that keyword is considered. Finally, the weight of all found keywords is totaled using the equation provided below to determine the frequency score. The frequency score may be defined as:

Similarity score=frequency of each word×occurrence

The frequency of keywords in a document may be calculated based on the below mentioned equation:

Frequency=(sum of weight of the keyword)/(Total Number of documents in that class;

TF(t,d)=(term 't' occurrence in 'd')/(total terms in 'd'), where d corresponds to document, t is given word;

IDF(t,D)=log(N/DF(t)), where N is the Total Number of documents in the Corpus D', DF(t) is Total number of document in the corpus that contains the term 't';

TFIDF(t,d,D)=TF(t,d)×IDF(t,D), where TFIDF is Weight of term 't', TF(t,d)—Term Frequency of 't' in document 'd', IDF(t,D)—Inverse Document Frequency of 't' in document corpus D, D—Corpus, TFIDF—is the weight of the word 't'

This calculation is repeated using all the frequency table (i.e. for all the document class). In an example, the class which has the maximum frequency score is the expected document type:

Document Type=Max $(\Sigma_{k=0}^{n}$ freq(k)*0), where 'o' relates to occurrence of keyword, occurrence is '0' if the keyword is not found in the given document, else '1', and n—No of keywords in a document type. The same is pictorially represented in FIG. 2c, where similarity score 235-1, 235-2, . . . 235-n with respect to each document type in the mapping data is computed for the base document 115. The document type corresponding to maximum or highest frequency score is identified as the document type as pictorially represented at 240.

Referring back to FIG. 2a, at block 240 tagging, such as NLP tagging may be performed using the data mapper 120 for dynamic mapping. Further at block 245, dynamic word to line calibration may also be performed to determine the position of the data items w.r.t. line numbers in the base document 215 as described above. At block 250, relative data extraction may be performed to associate meaning to the data items by associating relevant data field with the keyword. For the purpose, the data populator 125 and the data mapper 120 may be implemented.

For static keyword mapping, data from a database 250, such as SQLite database may be used, which may include details pertaining to position of the data fields in various document types. For static mapping, details pertaining to relevant document type may be extracted and compared with the position details of the extracted data items. The positioning data and data pertaining tables (mapping data) may configured through the interface 255 and provided to the database 250/system 100.

Upon mapping and obtaining the data fields corresponding to the data items, data items with associated data fields may be provided as indicated at step relative data extraction 260. In case of distributed environment, a text file containing the relevant information (data items with associated data fields) are provided to a local device, for instance, in JASON format, as indicated at 265. The local device may then auto-populate the electronic document using this information.

Figure 3:
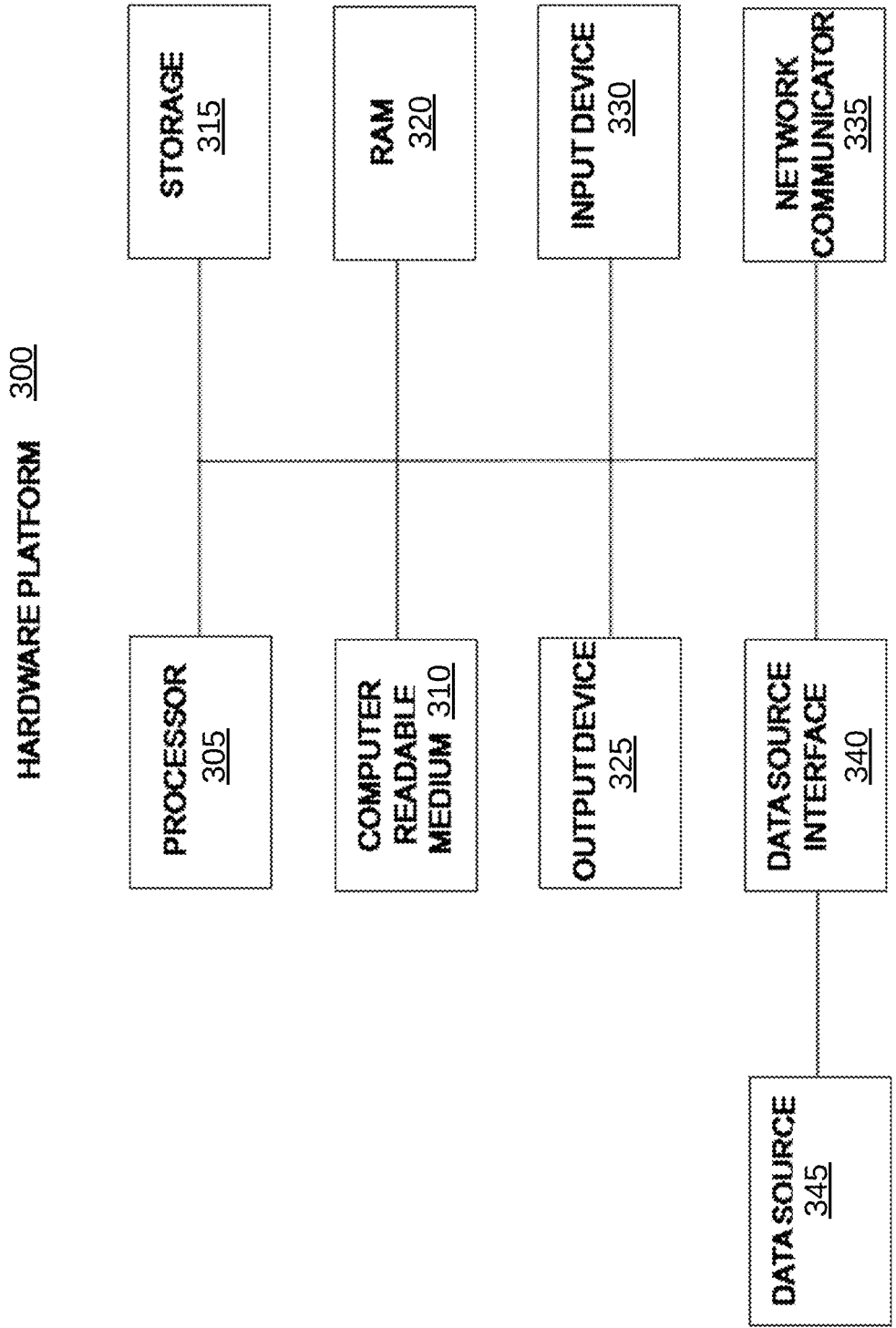
FIG. 3 illustrates a hardware platform for implementation of the validation system, according to an example embodiment of the present disclosure.

FIG. 3 illustrates a hardware platform 300 for implementation of the system 100, according to an example of the present disclosure. In an example embodiment, the hardware platform 300 may be a computer system 300 that may be used with the examples described herein. The computer system 300 may represent a computational platform that includes components that may be in a server or another computer system. The computer system 300 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 300 may include a processor 305 that executes software instructions or code stored on a non-transitory computer readable storage medium 310 to perform methods of the present disclosure. The software code includes, for example, instructions to obtain data, reconcile data, generate confidence score, and perform summarization. In an embodiment, the receiver 105, the data extractor 110, the document type identifier 115, the data mapper 120, and the data populator 125 are a software code or a component performing the above steps.

The instructions on the computer readable storage medium 310 are read and stored the instructions in storage 315 or in random access memory (RAM) 320. The storage 315 provides a large space for keeping static data where at least some instructions could be stored for later execution. The stored instructions may be further compiled to generate other representations of the instructions and dynamically stored in the RAM 320. The processor 305 reads instructions from the RAM 320 and performs actions as instructed.

The computer system 300 further includes an output device 325 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 300 further includes input device 330 to provide a user or another device with mechanisms for entering data and/or otherwise interact with the computer system 300. The input device may include, for example, a keyboard, a keypad, a mouse, or a touchscreen. In an embodiment, output of the intelligent risk management agent is displayed on the output device 325. Each of these output devices 325 and input devices 330 could be joined by one or more additional peripherals.

A network communicator 335 may be provided to connect the computer system 300 to a network and in turn to other devices connected to the network including other clients, servers, data stores, and interfaces, for instance. A network communicator 335 may include, for example, a network adapter such as a LAN adapter or a wireless adapter. The computer system 300 includes a data source interface 340 to access data source 345.

Figure 4:
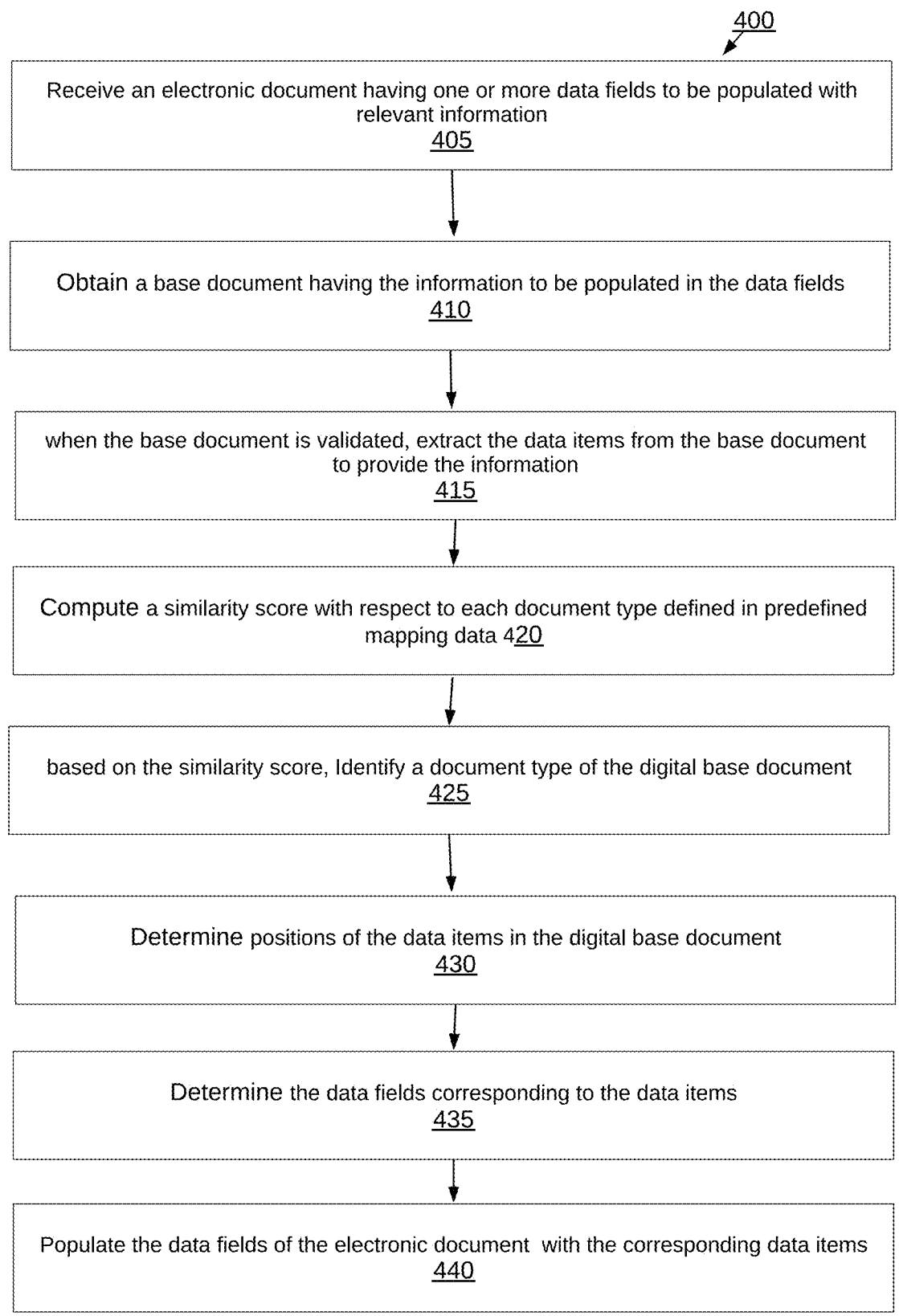
FIG. 4 illustrates a computer-implemented method for auto-populating data fields in an electronic document, according to an example embodiment of the present disclosure.

FIG. 4 illustrates a computer-implemented method 600 depicting functionality of the system 100, according to an example embodiment of the present disclosure. For the sake of brevity, construction and operational features of the system 100 which are explained in detail in the description of FIG. 1-FIG. 5 are not explained in detail in the description of FIG. 6.

At method block 405, the method 400 commences by receiving an electronic document having one or more data fields to be populated with relevant information. The data fields indicate the information requested, for instance, "name", "total payment", "date of birth", etc. In an example, the electronic document may be received by the receiver 105.

At block 410, a base document having the information to be populated in the data fields may be obtained. The base document is document may have a predefined format, for instance, an invoice slip, a driver's license, a passport, a health card, and the like. In other example, the base document may not have a predefined structure. The base document may include data items, which are the indicative of the requested information. Considering the example of the driver's license, the data items may be "Name", "John", "Date of birth", "18-01-1984", "of" "the", etc. The base document may be provided by a user or obtained from a repository, for instance, gallery folder of a smartphone and/or a remote repository. In an example, the data extractor 110 may obtain the base document.

At block 415, when the base document is validated, the data items from the base document may be extracted to provide the information, using a visual analytic tool. The data item comprises at least one of text data and image data, the text data comprises at least one of a keyword and a text term. The keyword may be a static term, which is consistent across multiple base documents of a given document type, while the text term may be a dynamic term, whose value changes for different documents in the same document type. Referring to previous example of a driver's license (document type), "Name" may be considered a keyword and "John" a text term. An example process of data extraction is described in FIG. 5. In an example, the data extractor 110 may perform the data extraction.

At block 420, a similarity score with respect to each document type defined in predefined mapping data may be computed. The predefined mapping data includes, for each document type, a weight associated with the data item occurring in corresponding document type, the weight being associated based on an importance of the data item to the corresponding document type. For computing the score, the keywords appearing in a document type may be searched for in the base document or vice-versa, and based on weight associated with the keywords that appear in the base document and the document type, a similarity score may be generated. In an example, the document type identifier 115 may determine the similarity score.

At block 425, based on the similarity score, a document type of the digital base document may be identified. In example, a document type corresponding to highest score may be selected as the document type of the base document. In an example, the document type identifier 115 may identify the document type.

At block 430, positions of the data items in the digital base document may be determined. The position may be determined using line-to-word calibration. Further data extraction may be performed using a static approach, where extraction is performed, based on keywords stored in a database; or a dynamic approach, using NLP techniques, where keywords, such as "name", "date of birth", "expiry date" may be detected and corresponding position may be determined. In an example, some documents may be considered as standard, such as driver's license that have a specific format, while some others such as utility bills, lease agreement, receipts, etc may be non-standard and may not have any specified format. For most of the standard documents, dynamic keyword extraction may be used and for non-standard documents, the static approach may be used, where the keywords are obtained from a repository built by training documents.

An example line to word calibration process for determining position is described with reference to FIG. 6. In an example, the positions may be determined by the data mapper 120.

At block 435, the keywords corresponding to the data items may be determined based on the position of the data item in the identified document type and the position of the data item in the digital base document. The keywords represent the data items to be populated, for instance, "name" and "date of birth". In another example, NLP may be used for item to field mapping. The keywords may be associated with corresponding extracted data items so that these may be appropriately populated in the electronic document.

At block 440, the data fields of the electronic document may be populated with the corresponding data items to provide the required information in an automated manner. In an example, the data populator 125 may populate the data fields. For instance, the information may be provided to a local device, which may fill in the information or the system implementing the data populator may auto-fill the electronic document.

Figure 5:
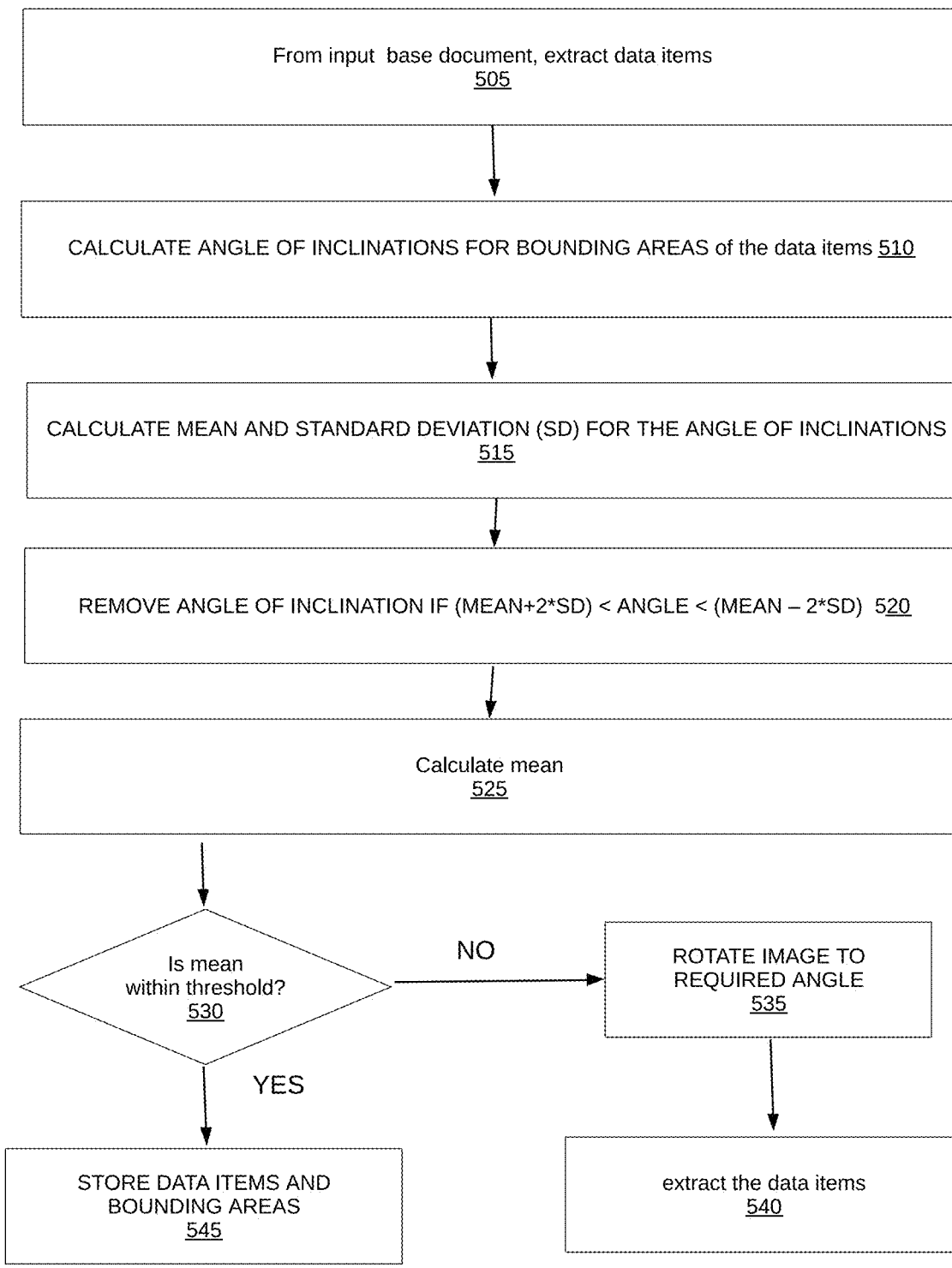
FIG. 5 illustrates a data extraction process, according to an example embodiment of the present disclosure.

FIG. 5 illustrates a process 415 for determining validity of a base document for data extraction, according at example implementation of the present subject matter. In an example, the process 415 may be performed by the data extractor 110. At block 505, from an input base document, data items are extracted using visual analytics tools. At block 510, angle of inclinations for bounding areas of the data items may be computed. At block 515, mean and standard deviations for the angle of inclinations are determined. At block 520, the angle of inclination is removed if mean+2*SD<angle< (mean−2*SD). At block 525, mean angle of inclination is computed. At bock 530, if the mean is not in the predefined range, the process 415 branches to block 535, where the image is rotated to the required angle. At block 540, the data items are extracted from the rotated image. If the mean is in the predefined range, the process 415 proceeds to block 545, where the data items along with bounding point information is stored.

Figure 6:
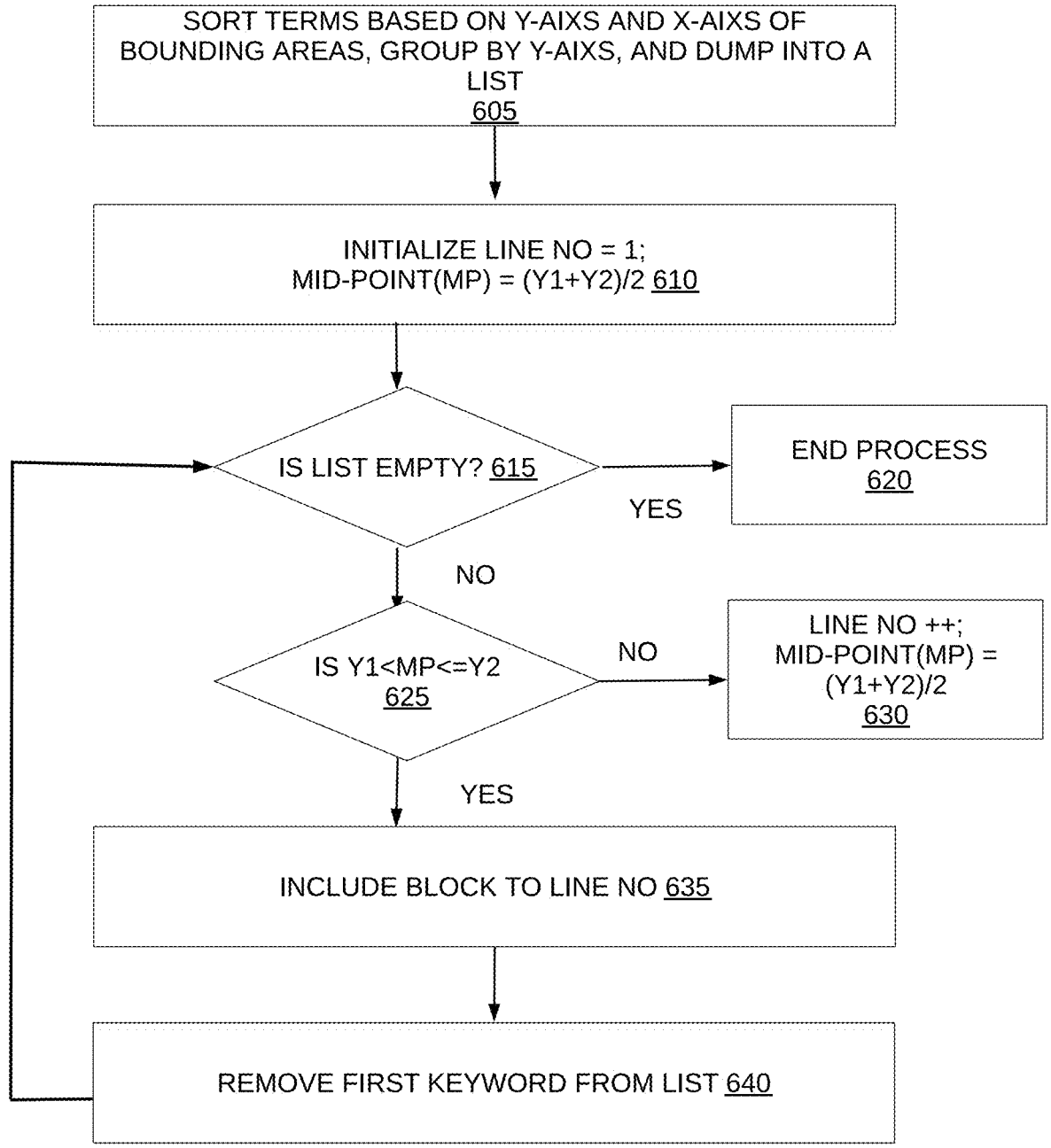
FIG. 6 illustrates a data positioning process, according to an example embodiment of the present disclosure

FIG. 6 illustrates a process for determining position of the data items in terms of lines of the base document, according at example implementation of the present subject matter. In an example, the process 430 may be performed by the data mapper 120.

At block 605, the data items are sorted based on y-axis and x-axis of bounding areas, grouped by y-axis, and dump into a list. At block 610, LINE NO 1 is initialized and MID-POINT (MP) is defined as (Y1+Y2). At block 615, it is ascertained if the list is empty. In case at block 615 it is ascertained that the list is empty, the process 430 branches to block 620, where the process ends. However, if at the block 615 it is ascertained that the list is not empty, the process 430 proceeds to block 625. At block 625, it is ascertained if Y1<MP<=Y2. If no, the process branches to block 630, where the line number is incremented with LINE NO with MP as (Y1+Y2)/2. If it is ascertained that Y1<MP<=Y2, the process 430 proceeds to block 635, where block (data item) is included in the line number. At block 640, the included data element/keyword is removed from the list and process is repeated for rest of the data items in the list.

Figure 7:
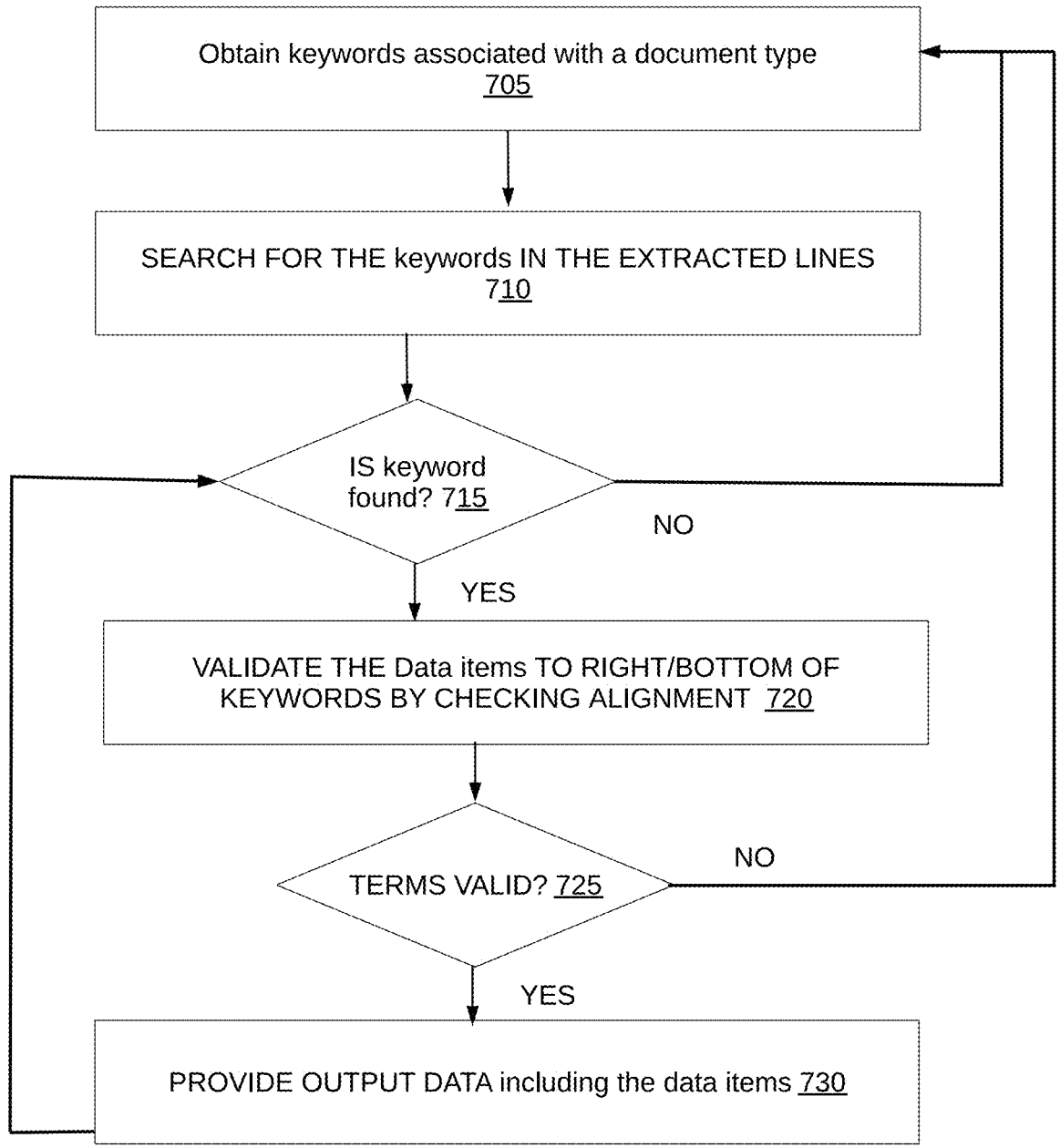
FIG. 7 illustrates a data populating process, according to an example embodiment of the present disclosure.

FIG. 7 illustrates a process for data mapping, according at example implementation of the present subject matter. In an example, the process 435 may be performed by the data mapper 120.

At block 705, keywords associated with a document type of the based document may be obtained. At block 710, the keywords may be searched in extracted lines. If at block 715, a keyword is found, at block 720, the data items to right/bottom of keyword may be validated, for instance, alignment may be checked. At block 725, it may be determined if the data items are validated. If yes, at block 730, the data items are extracted and provided as output.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A computing system, comprising:
   a processor;
   a receiver coupled to the processor to receive an electronic document having a data field to be populated with information;
   a data extractor coupled to the processor to,
   obtain a digital base document having the information to be populated in the data field;
   calculate a combined angle of inclination of the digital base document upon detecting each keyword occurring in the digital based document, wherein each keyword is detected by using an optical character recognition (OCR) technique, and wherein the combined angle of inclination is based on angle of inclination of a plurality of keywords occurring in the digital base document;
extract a first keyword from the digital base document to provide the information, using a visual analytic tool, the first keyword comprising at least text data, the first keyword being consistent across multiple base documents of a given document type;
validate the digital base document for data extraction by determining whether the combined angle of inclination is within a predefined angle range; and
rotate the digital base document to the predefined angle range based on the combined angle of the digital base document, when the digital base document is not validated;
a document type identifier coupled to the processor to, compute, for the digital base document, a similarity score with respect to each of the document type defined in predefined mapping data, the predefined mapping data including, for each document type, a weight associated with each keyword occurring in that document type,
wherein computing the similarity score with respect to each of the document type comprises:
identifying a second set of keywords, occurring in the document type, corresponding to the first keyword; and
based on identifying, computing the similarity score based on a frequency of each identified keyword, wherein the frequency is based on the weight of each of the identified second set of keywords and a total number of documents in a corresponding document type against which the similarity score is being calculated, and wherein the weight of each of the identified second set of keywords is calculated based on a term frequency and an inverse document frequency of the corresponding identified keyword, the term frequency being indicative of an occurrence of the corresponding identified keyword, and the inverse document frequency being indicative of a degree of importance of the corresponding identified keyword; and
identify a document type corresponding to the digital base document, based on the similarity score;
a data mapper coupled to the processor to,
determine a position of the first keyword in the digital base document;
and
determine a second keyword, from the identified document type, corresponding to the first keyword, based on the position of the first keyword in the identified document type and the position of the first keyword in the digital base document, the second keyword indicative of the data field to be populated;
and
a data populator coupled to the processor to provide the first keyword to populate the data field, based on the determined second keyword.

2. The system of claim 1, wherein to determine the position of the first keyword, the data mapper is to associate a line number with each keyword occurring in the digital base document, based on a Cartesian position of the first keyword in the digital base document, a line being a predefined portion of the digital base document extending from one vertical edge to another vertical edge of the digital base document.

3. The system as claimed in claim 2, wherein to determine the second keyword corresponding to the first keyword, the data mapper is to compare the position of the first keyword with a corresponding position of the first keyword in the identified document type, the position being defined based on the line number associated with each keyword occurring in the identified document type.

4. The system as claimed in claim 1, wherein the data populator is to provide the first keyword in a format associated with the data field of the electronic document, and wherein the generated data item is populated in the data field.

5. A method comprising:
receiving an electronic document having a data field to be populated with information;
obtaining a digital base document having the information to be populated in the data field;
calculating a combined angle of inclination of the digital base document upon detecting each keyword occurring in the digital based document, wherein each keyword is detected by using an optical character recognition (OCR) technique, and wherein the combined angle of inclination is based on angle of inclination of a plurality of keywords occurring in the digital base document;
extracting a first keyword from the digital base document to provide the information, using a visual analytic tool, the first keyword comprising at least text data, the first keyword being consistent across multiple base documents of a given document type;
validating the digital base document for data extraction by determining whether the combined angle of inclination is within a predefined angle range;
rotating the digital base document to the predefined angle range based on the combined angle of the digital base document, when the digital base document is not validated;
computing, for the digital base document, a similarity score with respect to each of the document type defined in predefined mapping data, the predefined mapping data including, for each document type, a weight associated with each keyword occurring in that document type,
wherein computing the similarity score with respect to each of the document type comprises:
identifying a second set of keywords, occurring m the document type, corresponding to the first keyword; and
based on identifying, computing the similarity score based on a frequency of each identified keyword, wherein the frequency is based on the weight of each of the identified second set of keywords and a total number of documents in a corresponding document type against which the similarity score is being calculated, and wherein the weight of each of the identified second set of keywords is calculated based on a term frequency and an inverse document frequency of the corresponding identified keyword, the term frequency being indicative of an occurrence of the corresponding identified keyword, and the inverse document frequency being indicative of a degree of importance of the corresponding identified keyword;
identifying a document type of the digital base document, based on the similarity score;
determining a position of the first keyword in the digital base document;

determining a second keyword, from the identified document type, corresponding to the first keyword, based on the position of the first keyword in the identified document type and the position of the first keyword in the digital base document, the second keyword indicative of the data field to be populated; and populating the data field of the electronic document with the first keyword, based on the second keyword corresponding to the first keyword.

6. The method as claimed in claim 5, wherein computing the position comprises associating a line number with the first keyword, based on a Cartesian position of the first keyword in the digital base document, a line being a predefined portion of the digital base document extending from one vertical edge to another vertical edge of the digital base document.

7. The method as claimed in claim 6, wherein the determining the first keyword comprises comparing the position of the first keyword with a corresponding position of the first keyword in the identified document type, the position being defined, based on the line number associated with each keyword occurring in the identified document type.

8. The method as claimed in claim 5, wherein the populating comprises providing the first keyword associated with the data field to a local device to populate the electronic document.

9. A non-transitory computer readable medium including machine readable instructions that are executable by a processor to:

receive an electronic document having a data field to be populated with information;

obtain a digital base document having the information to be populated in the data field;

calculate a combined angle of inclination of the digital base document upon detecting each keyword occurring in the digital based document, wherein each keyword is detected by using an optical character recognition (OCR) technique, and wherein the combined angle of inclination is based on angle of inclination of a plurality of keywords occurring in the digital base document;

extract a first keyword from the digital base document to provide the information, using a visual analytic tool, the first keyword comprising at least text data, the first keyword being consistent across multiple base documents of a given document type;

validate the digital base document for data extraction by determining whether the combined angle of inclination is within a predefined angle range;

rotate the digital base document to the predefined angle range based on the combined angle of the digital base document, when the digital base document is not validated;

compute, for the digital base document, a similarity score with respect to each of the document type defined in predefined mapping data, the predefined mapping data including, for each document type, a weight associated with each keyword occurring in that document type, wherein computing the similarity score with respect to each of the document type comprises:

identifying a second set of keywords, occurring in the document type, corresponding to the first keyword; and based on identifying, computing the similarity score based on a frequency of each identified keyword, wherein the frequency is based on the weight of each of the identified second set of keywords and a total number of documents in a corresponding document type against which the similarity score is being calculated, and wherein the weight of each of the identified second set of keywords is calculated based on a term frequency and an inverse document frequency of the corresponding identified keyword, the term frequency being indicative of an occurrence of the corresponding identified keyword, and the inverse document frequency being indicative of a degree of importance of the corresponding identified keyword;

identify a document type of the digital base document, based on the similarity score;

determine a position of the first keyword in the digital base document;

determine a second keyword, from the identified document type, corresponding to the first keyword, based on the position of the first keyword in the identified document type and the position of the first keyword in the digital base document, the keyword indicative of the data field to be populated; and provide the first keyword to be populated in the data field of the electronic document, based on the keyword corresponding to the first keyword.

10. The non-transitory computer readable medium as claimed in claim 9, wherein to compute the position of the first keyword, the processor is to associate a line number with the first keyword, based on a Cartesian position of the first keyword in the digital base document, a line being a predefined portion of the digital base document extending from one vertical edge to another vertical edge of the digital base document.

11. The non-transitory computer readable medium as claimed in claim 9, wherein to determine the keyword, the processor is to compare the position of the first keyword data item with a corresponding position of the first keyword data item in the identified document type, the position being defined, based on the line number associated with each keyword occurring in the identified document type.

* * * * *

UNITED STATES PATENT AND TRADEMARK OFFICE
CERTIFICATE OF CORRECTION

| | | |
|---|---|---|
| PATENT NO. | : 11,010,423 B2 | Page 1 of 1 |
| APPLICATION NO. | : 16/105429 | |
| DATED | : May 18, 2021 | |
| INVENTOR(S) | : Subhasish Roy et al. | |

It is certified that error appears in the above-identified patent and that said Letters Patent is hereby corrected as shown below:

In the Claims

In Column 16, Line 46, Claim 5, reads "m" should read "in".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*